(12) United States Patent
Blanding et al.

(10) Patent No.: US 9,195,508 B1
(45) Date of Patent: Nov. 24, 2015

(54) ALLOCATION OF RESOURCES AMONG COMPUTER PARTITIONS USING PLURAL UTILIZATION PREDICTION ENGINES

(75) Inventors: William H. Blanding, Bow, NH (US);
Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1464 days.

(21) Appl. No.: 11/745,737

(22) Filed: May 8, 2007

(51) Int. Cl.
*G06F 9/46* (2006.01)
*G06F 9/50* (2006.01)

(52) U.S. Cl.
CPC .............. *G06F 9/505* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 5,522,070 A * | 5/1996 | Sumimoto | 718/104 |
| 6,957,435 B2 | 10/2005 | Armstrong et al. | |
| 6,988,134 B2 | 1/2006 | Thorpe et al. | |
| 7,035,786 B1 * | 4/2006 | Abu El Ata et al. | 703/21 |
| 7,089,306 B2 | 8/2006 | Thorpe et al. | |
| 7,308,687 B2 * | 12/2007 | Trossman et al. | 718/104 |
| 7,711,655 B2 * | 5/2010 | Abe et al. | 705/400 |
| 2002/0019873 A1 * | 2/2002 | Goldszmidt et al. | 709/228 |
| 2003/0046396 A1 * | 3/2003 | Richter et al. | 709/226 |
| 2005/0108753 A1 * | 5/2005 | Saidi et al. | 725/46 |
| 2006/0111960 A1 * | 5/2006 | Chess et al. | 705/10 |
| 2007/0112723 A1 * | 5/2007 | Alvarez et al. | 707/2 |
| 2008/0155550 A1 * | 6/2008 | Tsafrir et al. | 718/103 |
| 2008/0172671 A1 * | 7/2008 | Bouillet et al. | 718/104 |

\* cited by examiner

*Primary Examiner* — Tammy Lee
(74) *Attorney, Agent, or Firm* — Clifton L. Anderson

(57) ABSTRACT

A multi-partition computer system includes a utilization monitor for monitoring resource utilization, plural prediction engines for predicting utilization during a next allocation period, a prediction rater for rating said prediction engines based on the accuracy of their predictions, and an allocation implementer for implementing an allocation determined as a function of a prediction by a highest-rated of said prediction engines as determined by the prediction rater.

24 Claims, 3 Drawing Sheets

ALLOCATION OF RESOURCES AMONG COMPUTER PARTITIONS USING PLURAL UTILIZATION PREDICTION ENGINES

BACKGROUND OF THE INVENTION

Efficiently allocating computer resources to software workloads can reduce the total cost associated with enterprise-class computing. Savings result from decreasing the amount of resources initially purchased and from increasing the amount of purchased resources that can be powered down to save energy costs. Since workload demands change over time, efficient allocation requires frequent reallocations. A resource controller that accurately predicts workload demands, e.g., based on prior demand levels, can provide for efficient reallocations.

The way in which demand changes over time varies from workload to workload. Some workloads have fairly constant demands, others may vary periodically, while others vary as a function of external factors, such as economic indicators or world events. A procedure for predicting future workload demands that predicts accurately for one workload may not predict accurately for another. To address this variability, a resource controller can allow a user to manually assign prediction procedures to workloads and/or employ an expert system to assign prediction procedures to workloads. However, the demand patterns of a workload can also vary over time, so the accuracy of a well-selected prediction procedure can degrade over time.

Herein, related art is described to facilitate understanding of the invention. Related art labeled "prior art" is admitted prior art; related art not labeled "prior art" is not admitted prior art.

BRIEF DESCRIPTION OF THE DRAWING

The figure depicts implementations/embodiments of the invention and not the invention itself.

DETAILED DESCRIPTION

The present invention uses a competitive approach to predicting demand. For a given combination of workload, resource to be allocated, and allocation period, plural predictions are generated. Subsequently, utilization data from the period to which the predictions apply is used to evaluate the accuracy of each prediction. Prediction procedures can be rated according to a time-averaged function of the accuracy of their respective predictions. For each set of competing predictions, the one generated by the prediction procedure that is highest rated at the time is selected as the basis for the allocation for the upcoming allocation period. If a formerly highest ranked prediction procedure is overtaken by a different prediction procedure, the latter can supply the predictions that are used to determine allocations.

Figure 1:
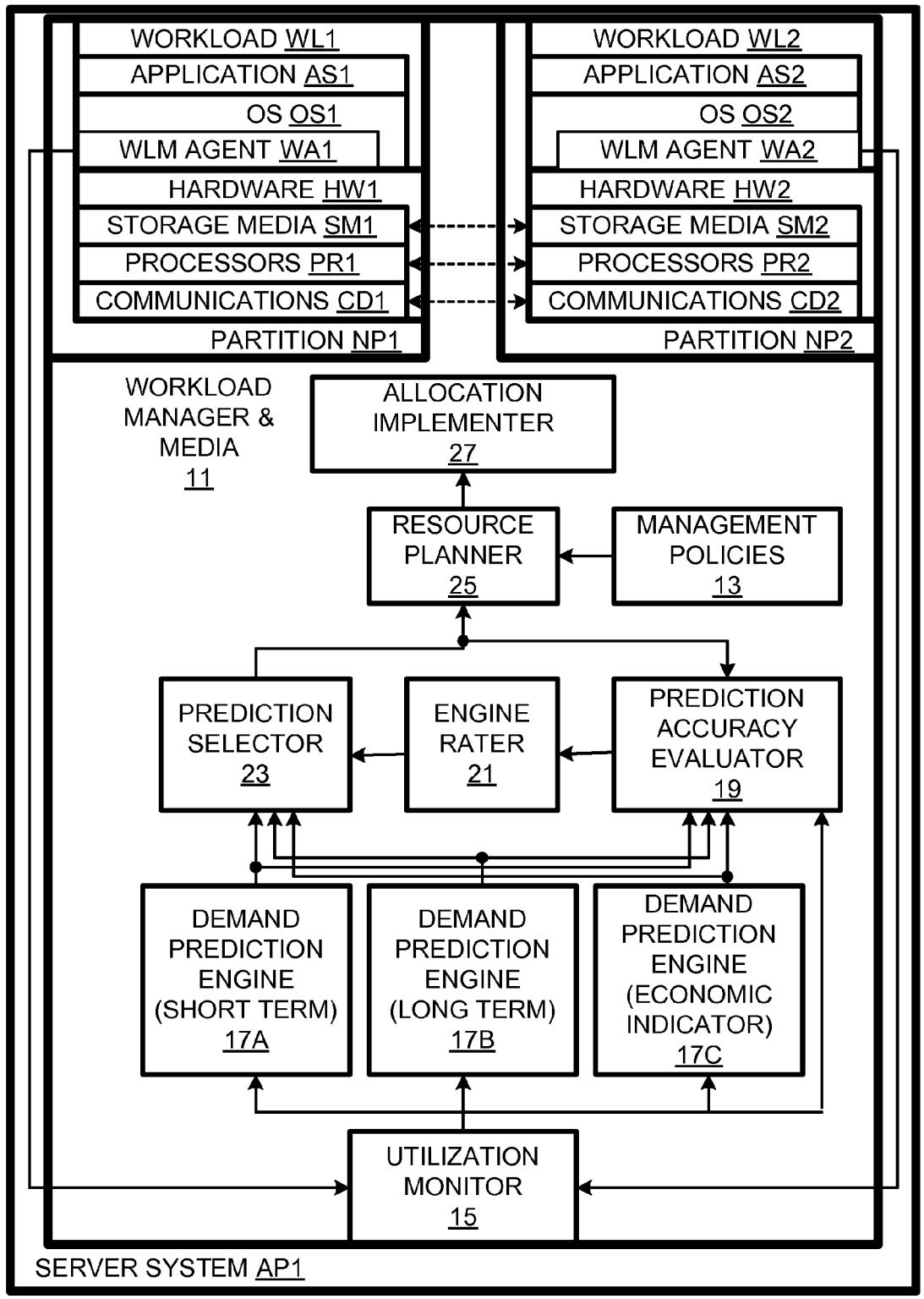
FIG. 1 is a schematic diagram of a server in accordance with an embodiment of the invention.

As shown in FIG. 1, a server system AP1 implementing an embodiment of the invention includes a workload manager and associated media 11 storing the software components thereof, and partitions NP1 and NP2. Other embodiments of the invention may include more than two partitions. Hardware HW1 of partition PR1 includes processors PR1, communications devices CD1 (e.g., I/O devices and network adapters), and storage media SM1 (e.g., main memory and disk-based storage). The software workload WL1 running on hardware HW1 includes an application program AS1 and an operating system OS1 including a workload manager agent WA1. Likewise, hardware HW2 of partition NP2 includes processors PR2, communications devices CD2, and storage media SM2. A workload WL2 running on this hardware includes an application program AS2 and an operating system OS2 including a workload manager agent WA2. While this embodiment uses hardware partitions, other embodiments may use virtual partitions or any other container technology for separating workloads.

Workload manager 11 allocates computer resources between partitions NP1 and NP2, and thus between workloads WL1 and WL2 in accordance with management policies 13. Workload manager 11 includes a utilization monitor 15, demand prediction engines 17A, 17B, and 17C, a prediction evaluator 19, a prediction engine rater 21, a prediction selector 23, a resource planner 25, and an allocation implementer 27.

The purpose of workload manager 11 is to optimally allocate allocable computer resources to workloads for each allocation period. The computer resources can be, for example, processors, computer-readable storage media (e.g., memory and disk-based storage), communications bandwidth (e.g., of a network interface card for an Ethernet network or a host-bus adapter for a storage array network), or licenses for such devices, to workloads. "Optimal" is defined in management policies 13, typically in terms of utilization levels required to ensure a desired level of performance for a given workload. The allocation implemented by allocation implementer 27 is determined by resource planner 25 in accordance with management policies 13 and demand predictions, which are in turn based on utilization data.

Utilization monitor 15 monitors utilization of a resource, e.g., during a current allocation period. Utilization data is collected first by workload management agents WA1 and WA2 for their respective workloads WL1 and WL2. Examples are the data collected can be percentage of processor cycles, percentage of available main memory, and percentage of communications bandwidth—all of these percentages being relative to an amount allocated to the respective workload. The utilization data can reflect slightly less than an entire allocation period to allow a little time before the next allocation period for the next allocation to be planned and implemented. Workload agents WA1 and WA2 forward the utilization data they collect to utilization monitor 15.

Demand prediction engines 17A, 17B, and 17C each provide a prediction for each combination of workload, resource to be allocated, and allocation period. "Short term" prediction engine 17A extrapolates a demand level based on any trend shown in the last few allocation periods. For an initial allocation period, it "predicts" the product of the original resource allocation level and a target utilization level; it then predicts that the demand for the second allocation period will match the actual demand level for the first allocation period; for subsequent allocation periods, a straight-line fit to demand data for the current and one or two preceding periods is extrapolated to predict demand levels.

Actual demand levels are determined for actual utilization levels by multiplying the utilization levels determined by utilization monitor 15 by the allocated resource level for the period associated with the utilization level. Each prediction engine stores the necessary data from previous allocation periods required for its predictions. Alternatively, a common database could store historical data for all engines 17A-17C to use.

Prediction engine 17B uses data gathered over a much longer term for its predictions. As it becomes available, prediction engine 17B uses data collected hourly, daily, weekly, monthly, and yearly to identify periodicities in demand. These periodicities are then taken into account in generating demand predictions. Prediction engine 17C associates demand level determinations with external factors such as world events and economic indicators to detect patterns that can be used to generate predictions. For example, major news events can trigger an increased number of accesses of a news website, and unfavorable economic indicators may reduce the access rate for retail business sites.

In the illustrated embodiment, each prediction engine outputs a resource level that should achieve a target utilization level specified by management policies 13 for each workload. Alternatively, the prediction engines could simply output a predicted demand level and the resource planner could augment that level by an amount required to achieve the target utilization.

The goal of each prediction engine is to provide a prediction that resource planner 25 can use to plan an allocation of resources to workloads for the next allocation period. However, resource planner 25 can use only one of the three predictions generated by prediction engines 17A, 17B, and 17C for each combination of workload, allocable resource, and allocation period. To this end, each utilization measurement for one period is used to evaluate the accuracy of the corresponding prediction made during the previous period.

Figure 2:
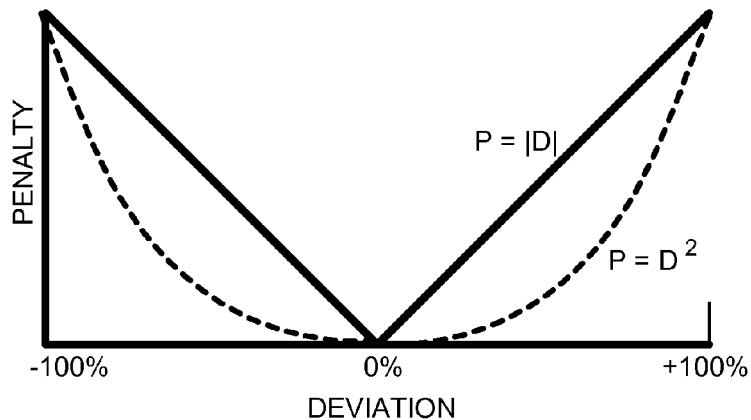
FIG. 2 is a graph showing penalty functions for use by the server of FIG. 1.

Prediction accuracy evaluator 19 assigns a penalty to each prediction as actual utilization data from the period to which a prediction applies is obtained. An administrator can adjust the penalty function by setting parameters, such as the shape of the penalty function (e.g., linear or quadratic), the coefficients, and the range about an expected utilization value about which a zero penalty is assigned. In the event a resource request corresponding to a selected prediction is fulfilled, the expected utilization is the target utilization. In the event a request based on a selected prediction is not completely fulfilled, the expected utilization is correspondingly higher than the target utilization. Increasingly positive penalties are assigned to increasing deviations to either side of the target or other expected utilization. FIG. 2 shows a pair of penalty functions, one based on the absolute value of the difference between the measured utilization and the expected utilization, the other based on the square of the deviation.

Figure 3:
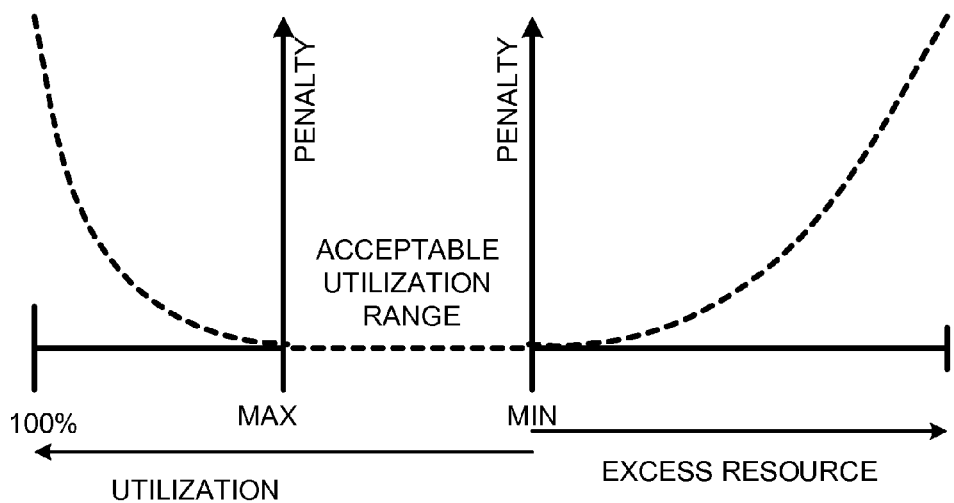
FIG. 3 is a graph showing another penalty function for use by the server of FIG. 1.

The embodiment of FIG. 1 employs a penalty function as depicted in FIG. 3. For deviations that are below the expected utilization, a penalty is assigned in terms of the square of the excess resources requested. For deviations that are above the target utilization, the conversion to resource levels is problematic due to boundary effects (clipping) at 100% utilization. In addition to the reason presented further below, this is one reason the penalty relates to deviations in utilization.

Engine rater 21 rates each prediction engine for each combination of workload, resource, and period according to a recency-weighted accumulation of penalties for the engine's predictions. The confidence level is highest for a prediction from the highest rated (least penalized) prediction engine. Prediction selection 23 selects the prediction from the highest rated prediction engine (which can change over time). Since the predicted demand levels are intended to achieve the target utilization level, they are the requested allocations, which, if met, will achieve the target utilization. In other embodiments, the selected demand corresponds to 100% utilization and the resource planner must augment that selection to obtain a request corresponding to the target utilization.

Resource planner 25 allocates resources on a priority basis, as specified by management policies 13. First certain minimum level resource requirements unrelated to the predictions are met. Then, allocations based on the predictions are met to the extent possible. If the available resources are not sufficient to meet all prediction-based requests, contentions are resolved as specified by management policies 13. Allocation implementer 27 simply implements whatever plan resource planner 25 generates.

Figure 4:
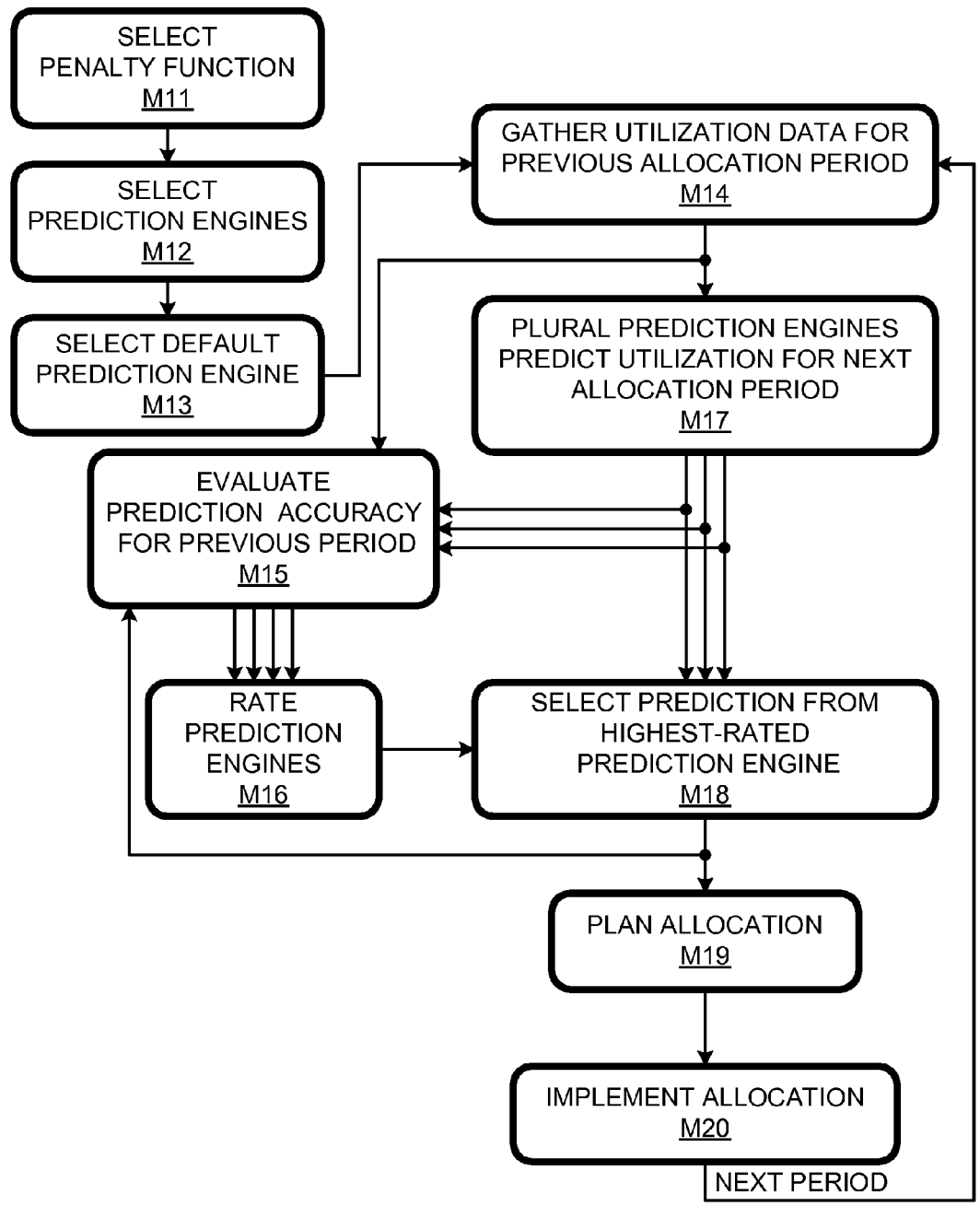
FIG. 4 is a flow chart of a method in accordance with an embodiment of the invention.

Workload manager 11 implements the following method ME1, which is flow-charted in FIG. 4. At method segment M11 a penalty function is selected. Penalty values are assigned to deviations from the targeted workload operation in the form of a penalty function. The penalty function can be preprogrammed or user entered. The user entry may consist of the user specification of the function itself, or, more likely, user designation of a few parameters from which such a function may be constructed.

While the penalty function could be symmetric about the expected utilization, the illustrated embodiment gives different weights depending on the relative value placed upon poor performance of the workload versus excess resource consumption by the workload, as shown in FIG. 3. Normally, higher deviations from the target would be expected to have a greater penalty. In this case, the penalty function should depend upon utilization for utilization values above the target utilization range and on excess resource for utilization values below the target range. This reflects the fact that high utilizations at any resource level may result in poor performance, while performance is expected to be acceptable for any utilization below the target and what is important is requesting resources that will remain unused.

The penalty function should be limited by the minimum and maximum resources that can be assigned to a partition. If the resource partition in which the workload is executing has a resource minimum greater than zero, and the actual resource consumption is less than that minimum any prediction engine that predicts a resource amount less that minimum receives a penalty of zero for the interval. That is, there is no point in penalizing a prediction engine for not predicting an unachievable low resource amount. Likewise, if the resource partition in which the workload is executing has a resource maximum, the maximum excess resource penalty is based on the difference between the resource required to achieve the utilization target and that maximum. That is, there is no point in penalizing a prediction engine for predicting an unachievable high resource amount.

At method segment M12, plural prediction engines are selected. A default engine, e.g., 17A, can be selected from these at method segment M13. The default engine should not require a long utilization history to achieve accurate results. For example, short-term prediction engine 17A can be set to use a default utilization initially, predict that the second period utilization will match the first period utilization, and then predict that a trend between the last two allocation periods will continue to the current allocation period. The default engine can be assigned manually. However, it suffices to have a single default engine, especially since specialized engines typically require some workload history to become effective.

System operation begins with method segment M14, which involves gathering utilization data for the previous allocation period. Utilization monitor 15 gathers utilization data for the recently completed allocation period from partitions NP1 and NP2. In the illustrated case, workload management agents WA1 and WA2 gather utilization data from their respective incorporating partitions and communicate the utilization data to utilization monitor 15. In the illustrated case, utilization periods are 30 seconds each, so that reallocations occur twice every minute absent some interruption. In the illustrated embodiment, the allocation period is user adjustable from one second to 10 minutes. In other embodiments, shorter and/or longer allocation periods are provided for.

Assuming predictions were generated in the previous period, the utilization data collected for that period is used to evaluate those predictions at method segment M15 using the penalty function selected at method segment M11. Of course, for initial periods and periods following interruptions, there may be no predictions to evaluate.

The prediction engines are then rated according to their accumulated penalties at method segment M16. The recent history of penalties for the prediction engines is used to select the appropriate engine for the workload for the current allocation period. Recent penalty values for the workload may be compared, for example, by computing a weighted average of the N most recent penalty values. Since at least some prediction engines will require a few or many intervals to have enough history to become effective, it may not be desirable to change engine selection every period, but rather to accumulate data every period and make a selection less frequently. However, selection should be made frequently enough to follow changes in workload characteristics. An arbitrary selection can be made in case of a tie.

The present invention allows for any number of competing prediction procedures. Short-term prediction engine 17A can look at a few recent periods and extrapolate an average utilization slope determined from these periods. Long-term prediction engine 17B can use filters to detect periodic changes in utilization. Predictor 17C can look for correlations between utilization and external factors, e.g., economic indicators, for use in predicting utilization.

While previous predictions are being evaluated and prediction engines are being rated, the prediction engines can generate predictions for the next allocation period at method segment M17. Utilization monitor 11 conveys the new utilization data to each of plural utilization prediction engines 17A, 17B, and 17C. Each utilization prediction engine 17A, 17B, and 17, stores the utilization data from the just-completed allocation period in a respective database. Based on a respective chronology, each prediction engine 17A, 17B, 17C generates a respective utilization prediction for the upcoming allocation period at method segment MS2.

At method segment M18, prediction selector 23 selects for output to resource planner 25 the current prediction from the prediction engine currently rated highest. Note that the output of prediction selector 23 is itself a prediction. Accordingly, it can be evaluated for accuracy by prediction evaluator 19. In general, the time-averaged accuracy of the selected predictions should equal or exceed the time-averaged accuracies of the prediction engines. However, in some cases, sticking with one prediction engine can yield better results than switching back and forth between prediction engines that alternately overtake each other in accuracy. Feeding back the selected prediction for evaluation permits one prediction engine to remain selected despite its accuracy being temporarily eclipsed.

At method segment M19, resource planner 25 plans an optimal allocation of resources between workloads WL1 and WL2 given the prediction selected at method segment M18. At method segment M20, the plan is implemented by allocation implementer 27. Then method ME1 can return to method segment M14 to gather utilization data for the ongoing allocation period.

Resource allocation intervals can range from less than a second to several minutes; prediction engine selections can be made every allocation period or once every five to ten to reduce the computational burden. In general, more frequent selection allows more frequent changes in the selected prediction engine. Typically, frequent change of prediction engines just means that several engines are equally suitable for a given workload. However, in the case of a complicated penalty function, it may be possible for two prediction engines with quite different operation characteristics to generate comparable penalty values. To avoid oscillating between two significantly different operating points, this condition can be detected and a requirement for a significant difference between penalties imposed before a switch of prediction engines is made or preference given directly to prediction engines operating in one or the other region of the penalty function space.

The invention also provides flexibility to add and replace prediction engines as the dynamics of resource utilization become better understood and better presented procedurally. Any plural number of predictors can be used, using a range of factors to recognize trends and patterns. Obviously, the factors may be application specific. For example, a retail web server is likely to be subject to seasonal fluctuations in demand, while project management applications can be subject to the specifics of the project schedule. For this reason, a predictor can consider different factors for each application. These and other variations upon and modifications to the illustrated embodiments are provided for by the present invention, the scope of which is defined by the following claims.

What is claimed is:

1. A computer system comprising:
    plural computer partitions to run respective workloads, wherein at least one of the plural computer partitions comprises at least one processor;
    a utilization monitor to monitor computer resource utilization by said workloads to yield resource utilization data;
    plural prediction engines to generate competing resource-demand predictions for a next allocation period, each of said prediction engines making a resource-demand prediction for resources to be required by each of said workloads for said next allocation period;
    a prediction-engine rater to calculate prediction penalties for the plural prediction engines using a penalty function, and to determine a best-performing prediction engine and one or more non-best-performing prediction engines for said next allocation period based on the prediction penalties, wherein a shape of the penalty function is specified by a user-settable shape parameter; and
    an allocation implementer to implement an allocation for said next allocation period, said allocation being based on the prediction made by said best-performing prediction engine and not on a prediction made by a non-best-performing prediction engine.

2. A computer system as recited in claim 1 wherein the shape of the penalty function indicates prediction penalties associated with discrepancies between respective resource-demand predictions and actual utilization values determined by said utilization monitor for said next allocation period.

3. A computer system as recited in claim 1 further comprising a prediction selector for selecting the prediction by said best-performing prediction engine for implementation by said allocation implementer for said next allocation period.

4. A computer system as recited in claim 1 wherein at least one of said prediction engines generates a non-historical prediction that is not based on utilization for an allocation period or periods preceding a current allocation period immediately preceding said next allocation period.

5. A computer system as recited in claim 1 wherein at least one of said prediction engines predicts based on extrapolating trends in utilization.

6. A computer system as recited in claim 1 further comprising a prediction selector for selecting the prediction of said best-performing prediction engine, said prediction-engine rater rating the output of said prediction selector along with the outputs of said prediction engines.

7. A computer system as recited in claim 1 wherein said allocation implementer allocates at least one of processors, storage media, and communications devices among partitions.

8. A computer system as recited in claim 1 wherein the shape of the penalty function indicates prediction penalties associated with deviations from optimum resource allocations as determined from said resource-utilization data.

9. A computer system as recited in claim 1 wherein the shape of the penalty function indicates a prediction penalties associated with combinations of deviations of actual utilization from predicted utilization and deviations from optimum resource allocations as determined from resource-allocation data.

10. A computer system as recited in claim 1 wherein a range and coefficients associated with the penalty function are adjustable through user-settable parameters.

11. A computer workload management method comprising:
plural prediction engines generating competing respective computer resource-demand predictions for an allocation period, each of said predictions predicting a resource demand for each of plural workloads;
calculating prediction penalties for the plural prediction engines using a penalty function, wherein a shape of the penalty function is specified by a user-settable shape parameter;
selecting, using at least one hardware processor, one of said predictions based on the prediction penalties so that the remaining of said predictions are non-selected predictions for said allocation period; and
implementing an allocation of computer resources to workloads for said allocation period, said allocation being a function of the selected prediction and not as a function of one of said non-selected predictions.

12. A method as recited in claim 11 further comprising:
evaluating an accuracy of each of said predictions based on actual utilization during said allocation period, wherein the shape of the penalty function indicates prediction penalties associated with accuracies of predictions.

13. A method as recited in claim 12 wherein said selecting comprises selecting a prediction from a prediction engine based on the prediction penalties over a plurality of allocation periods.

14. A method as recited in claim 13 wherein the shape of the penalty function indicates a prediction penalties associated with combinations of deviations of actual utilization from predicted utilization and deviations from optimum resource allocations as determined from resource-allocation data.

15. A method as recited in claim 11 wherein utilization data used by a first of said prediction engines in generating a prediction for said allocation period is accumulated over a longer duration than is utilization data used by a second of said prediction engines in generating its predictions for said allocation period.

16. A method as recited in claim 15 wherein a third of said prediction engines considers data other than time and utilization in generating its predictions.

17. A method as recited in claim 11 wherein said implementing involves reallocating at least one computer resource selected from a set including processors, memory, and communications devices from one workload to another workload.

18. A computer product comprising non-transitory computer-readable storage media encoded with code defining:
plural computer-executable prediction engines to generate competing respective computer-resource-demand predictions for a single allocation period, all of said resource-demand predictions specifying amounts of resource predicted to be demanded by a first set of plural workloads for said allocation period;
a prediction-engine rater executable by at least one hardware processor to calculate prediction penalties for the plural computer-executable prediction engines using a penalty function, wherein a shape of the penalty function is specified by a user-settable shape parameter;
a computer-executable prediction selector for selecting one of said predictions based on the prediction penalties so that the one or more others of said predictions are non-selected predictions; and
a computer-executable implementer for directing implementation of an allocation of computer resources to workloads for said allocation period, said allocation being a function of the selected prediction and not of said non-selected predictions.

19. A computer product as recited in claim 18, said code further defining:
a computer-executable prediction evaluator for evaluating an accuracy for each of said predictions.

20. A computer product as recited in claim 18, wherein the shape of the penalty function indicates a prediction penalties associated with combinations of deviations of actual utilization from predicted utilization and deviations from optimum resource allocations as determined from resource-allocation data.

21. A computer product as recited in claim 18 wherein the user-settable shape parameter comprises at least a linear shape and a quadratic shape.

22. A computer product as recited in claim 18 wherein utilization data used by a first of said prediction engines in generating a prediction for said allocation period represents a longer duration than utilization data used by a second of said prediction engines in generating its prediction for said allocation period.

23. A computer product as recited in claim 22 wherein a third of said prediction engines considers data other than time and utilization in generating its predictions.

24. A computer product as recited in claim 18 wherein said implementing involves reallocating at least one computer resource selected from a set including processors, memory, and communications devices from one workload to another workload.

* * * * *